June 16, 1925.  1,542,446
E. L. GRAUEL
LOCKING DEVICE
Filed Oct. 11, 1923
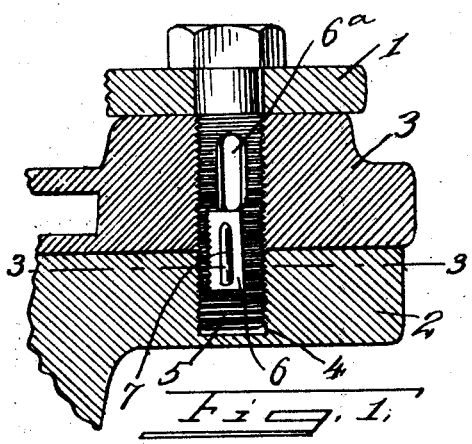
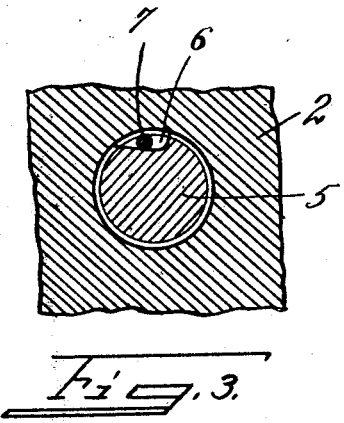
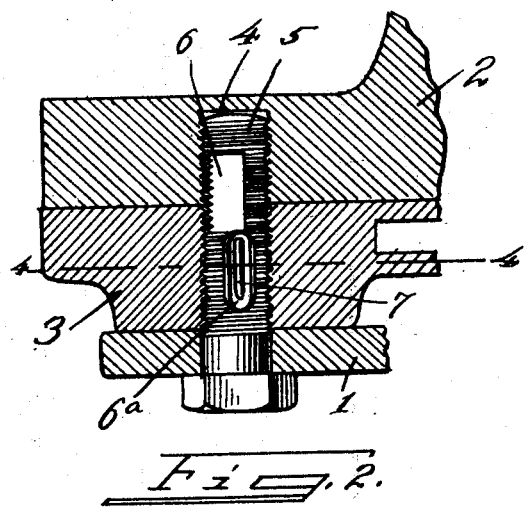
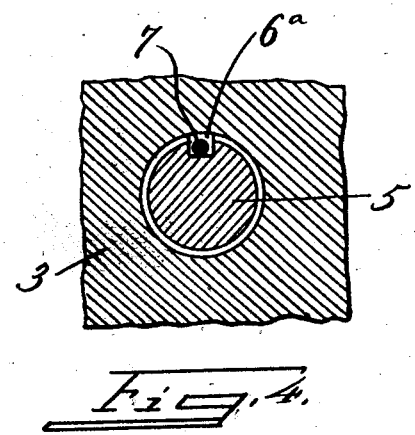
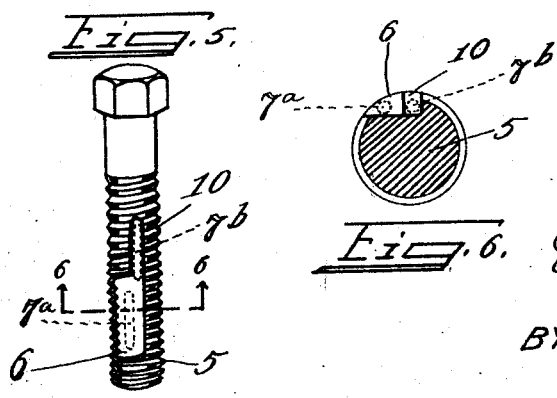
INVENTOR:
Edwin L. Grauel
BY
ATTORNEYS.

Patented June 16, 1925.

1,542,446

UNITED STATES PATENT OFFICE.

EDWIN L. GRAUEL, OF CINCINNATI, OHIO, ASSIGNOR TO THE GRAULOCK COMPANY, OF CINCINNATI, OHIO, A CORPORATION OF OHIO.

LOCKING DEVICE.

Application filed October 11, 1923. Serial No. 668,030.

*To all whom it may concern:*

Be it known that I, EDWIN L. GRAUEL, a citizen of the United States, and a resident of Cincinnati, in the county of Hamilton and State of Ohio, have invented certain new and useful Improvements in Locking Devices, of which the following is a full, clear, and exact description, reference being had to the accompanying drawing, forming part of this specification.

My invention relates to devices employed in the locking of two casings or parts together by means of bolts or screws, in such a way as to prevent removal of the bolts without a particular manipulation of the the parts.

It is my object, in the particular embodiment of the invention shown, to provide a means whereby a fuel lock may be assembled between the carbureter and manifold of an internal combustion engine, and held together with said parts, until the entire manifold and carbureter are removed from the engine and reversed in position. Generally it is my object to provide a mechanism for holding two or more parts together which will resist tampering by unauthorized persons.

I am aware that as a mechanical element, independent of its details, and irrespective of the use to which it is put, my invention follows the lines of certain ratchet devices of the past, which permit of movement in one direction but not in another by means of a pin or ball riding in a tapered groove between two rotary, co-axial members. I am not advised, however, that such a device has been employed in a case where movement in all directions is prevented between two members by such a mechanism, unless something else is done to relieve the clamping strain set up by the pin or ball. Neither am I advised that the general principle of the ratchet device noted, has been applied to bolt locks.

I accomplish the objects noted by that certain construction and arrangements of parts to be hereinafter more specifically pointed out and claimed.

In the drawings:

Figure 1 is a section taken through three combined parts, showing the bolt and lock in elevation.

Figure 2 is a like view showing the parts of Figure 1 reversed, or turned upside down.

Figure 3 is a section on the line 3—3 of Figure 1.

Figure 4 is a section on the line 4—4 of Figure 2.

Figure 5 is a perspective view of an alternative form of device.

Figure 6 is a section on the line 6—6 of Fig. 5.

The part 1 indicates a portion of the flange of a manifold, as used in an automobile engine, and 2 indicates the meeting flange of a carbureter. The casing part indicated at 3 is a portion of the housing of a valve device by means of which the passage from the carbureter to the manifold is blocked. The invention comprises the means for bolting the two flanges and the valve casing together so that it is not possible to separate them without drilling out the bolts, or else removing the manifold and carbureter, inverting them, and then unscrewing the bolts. It is thus my intention to force a thief to take the necessary time to remove the manifold and carbureter, before he can drive away an automobile under its own power.

As shown, it is customary to have threaded holes in the carbureter flange, and I preferably tap like holes in the casing to be mounted between the carbureter and the manifold. The usual bolts I replace with special bolts 5, which have a shallow laterally tapering groove 6 therein. At the top end of this shallow groove is a deeper groove or chamber 6ª, which extends from the deepest part of the shallow groove. I provide a small rounded pin 7, or it may be a ball, if desired, which when lying in the deepest part of the shallow groove will permit the screw to turn down into a threaded hole of matching pitch and diameter. An attempt to reverse the screw in order to remove it, will result in the ball or pin rolling into the shallowest portion of the groove and clamping the bolt against turning. Thus in the showing in Figure 3, the pin is in position to prevent rotation left to right, and permit rotation, right to left.

When the screw or bolt is down in a matching hole, and the devices bolted together are reversed or turned upside down, then a slight tapping will cause the pin to fall into the deep groove or chamber 6ª, where it will not act to prevent the withdrawal of the bolt. This position is shown in Figure 4.

By bolting the manifold, lock casing, and carbureter together with bolts of the character noted, and shown, it is evident that unscrewing of the bolts is prevented, unless the manifold and carbureter are freed from the engine and inverted.

There will naturally be other uses to which this bolt lock will be adaptable, and I have described one particular use, as indicating the value of the device from one point of view. The groove and pin could be in the tapped hole instead of in the bolt, as will be evident. Also instead of the deeper cavity 6ª, there may be formed a narrow cavity at the upper end of the laterally tapering groove 6. Thus in Figures 5 and 6, I show a narrow part at 10, at the upper end of the groove 6, extending from the deeper portion thereof. When the parts are inverted the pin or ball will enter the narrow portion, where it is held out of jamming, upon reversing of the screw or bolt.

By placing two pins into this last structure, as indicated at 7ª and 7ᵇ, it will be impossible to unscrew the bolt, without drilling off the end and dropping the pins out, as the upper pin will at all times keep the lower pin in jamming position upon reverse turning.

Having thus described my invention, what I claim as new and desire to secure by Letters Patent, is:—

1. In combination with a part having a threaded hole, a bolt threaded to match said hole, one of said members having a device therein adapted to jam the threaded engagement between the members upon revolution in one direction, and means for rendering said device ineffective upon an inversion of said members.

2. In an automobile lock, the combination of a carbureter part and a lock casing, of means for mounting the lock casing on the carbureter part comprising bolts, and means for preventing reverse turning of the bolts to release the parts until the carbureter has been inverted in its position.

3. A means for locking parts together comprising a member having a threaded hole, a bolt threaded to match said hole, and said bolt or member having a laterally tapering groove therein, and a metal piece mounted in said groove, and adapted to be forced to the shallowest portion thereof upon reverse turning of the bolt, thereby jamming the threads, said groove having at one end thereof a portion wherein said piece will move upon an endwise inversion of the bolt, said portion being adapted to prevent a movement of the metal piece to thread-jamming position.

4. In an automobile lock, the combination of a carbureter part and a lock casing, of means for mounting the lock casing on the carbureter part comprising bolts, and means for preventing reverse turning of the bolts to release the parts until the carbureter has been inverted in its position, and a narrow extension of the deepest portion of the groove into which the piece will move upon inverting of the bolt, said narrow extension adapted to hold the piece against jamming.

EDWIN L. GRAUEL.